(12) United States Patent
Kubota et al.

(10) Patent No.: US 8,018,558 B2
(45) Date of Patent: Sep. 13, 2011

(54) LIQUID CRYSTAL DISPLAY DEVICE

(75) Inventors: Hidenao Kubota, Mobara (JP); Hiroaki Miwa, Yokohama (JP)

(73) Assignee: Hitachi Displays, Ltd., Chiba (JP)

( * ) Notice: Subject to any disclaimer, the term of this patent is extended or adjusted under 35 U.S.C. 154(b) by 245 days.

(21) Appl. No.: 12/406,999

(22) Filed: Mar. 19, 2009

(65) Prior Publication Data

US 2009/0237602 A1 Sep. 24, 2009

(30) Foreign Application Priority Data

Mar. 19, 2008 (JP) ................................. 2008-071700

(51) Int. Cl.
*G02F 1/1333* (2006.01)
*G02F 1/1335* (2006.01)
*B32B 7/06* (2006.01)

(52) U.S. Cl. ............................ 349/122; 349/96; 428/354

(58) Field of Classification Search .................... None
See application file for complete search history.

(56) References Cited

U.S. PATENT DOCUMENTS 3,008,850 A * 11/1961 Ulrich ............................ 428/352
6,559,902 B1 * 5/2003 Kusuda et al. ................... 349/12
7,244,476 B2 * 7/2007 Sumida et al. .................. 428/1.5
2003/0232192 A1 * 12/2003 Kishioka et al. ................ 428/354
2004/0191509 A1 * 9/2004 Kishioka et al. ................ 428/354
2007/0148485 A1 * 6/2007 Kusama et al. ................. 428/520
2008/0050584 A1 * 2/2008 Noguchi et al. ................ 428/343
2008/0170179 A1 * 7/2008 Shiraishi ........................ 349/65

FOREIGN PATENT DOCUMENTS

JP 11-174417 7/1999

* cited by examiner

*Primary Examiner* — Tina Wong

(74) *Attorney, Agent, or Firm* — Antonelli, Terry, Stout & Kraus, LLP.

(57) ABSTRACT

A face plate on which a frame is formed for improved design aesthetics is bonded to a top surface of an upper polarizer of a liquid crystal display panel with a pressure-sensitive adhesive material. The frame on the face plate is formed from five layers of printing. The pressure-sensitive adhesive material has a three-layer structure having a first pressure-sensitive adhesive member, a base material, and a second pressure-sensitive adhesive member. The first pressure-sensitive adhesive member is formed thicker than the second pressure-sensitive adhesive member, and hence the pressure-sensitive adhesive material can maintain a necessary thickness above the frame formed on the face plate. The reliability of adhesion between the face plate and the liquid crystal display panel is thus improved.

5 Claims, 15 Drawing Sheets

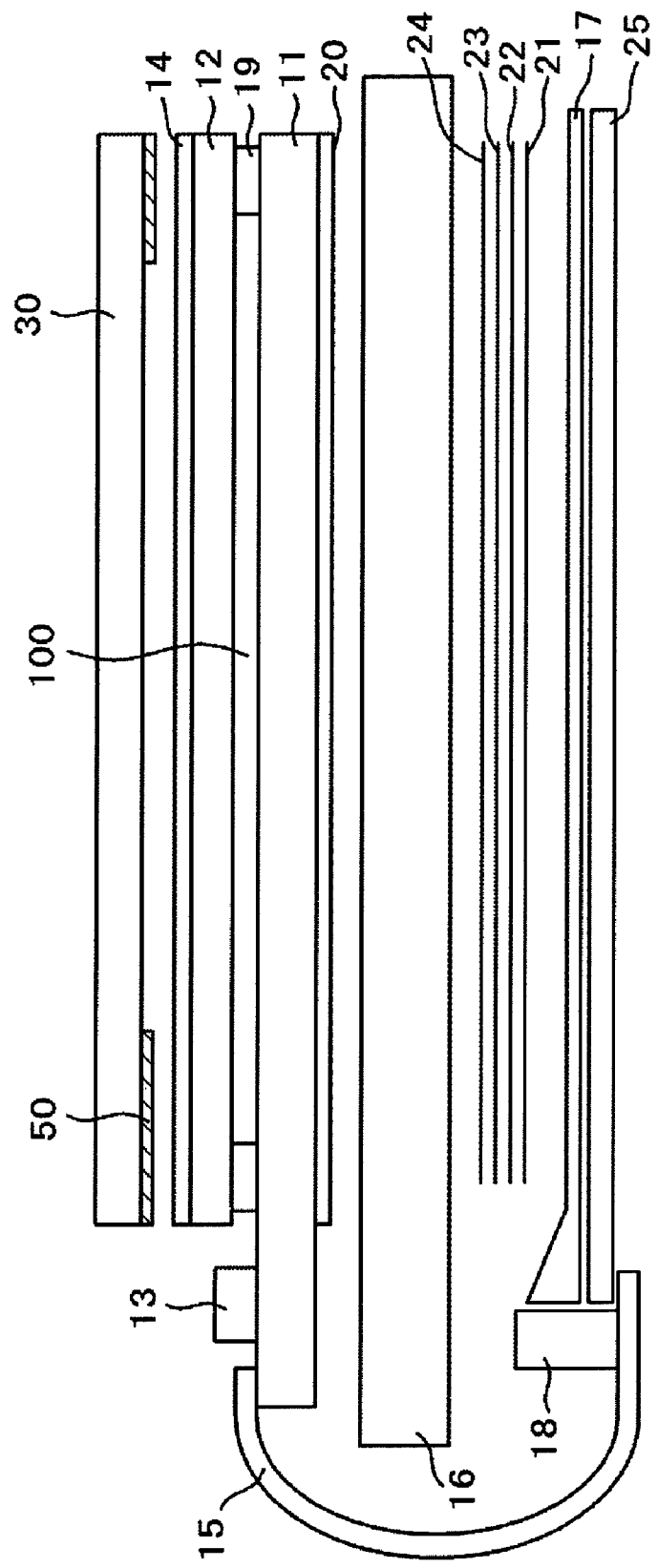

|  | glass plate | acrylic plate | difference |
|---|---|---|---|
| TC (/°C) | $8.7 \times 10^{-6}$ | $7 \times 10^{-5}$ | $6.9 \times 10^{-5}$ |
| L (mm) | 61.6 | 61.6 | 61.6 |
| ΔL (μm) | 65 | 520 | 455 |

# LIQUID CRYSTAL DISPLAY DEVICE

CROSS-REFERENCE TO RELATED APPLICATION

The present application claims priority from Japanese application JP 2008-071700 filed on Mar. 19, 2008, the content of which is hereby incorporated by reference into this application.

BACKGROUND OF THE INVENTION

1. Field of the Invention

The present invention relates to a display device, and more particularly, to a technique of enhancing strength and visibility of a miniaturized liquid crystal display device used in a mobile phone or the like.

2. Description of the Related Art

With respect to a liquid crystal display device, there has been a strong demand for the reduction of a thickness of a liquid crystal display panel along with a demand for the reduction of a profile size of a set while maintaining a screen at a fixed size. To decrease the thickness of the liquid crystal display panel, after manufacturing the liquid crystal display panel, an outer side of the liquid crystal display panel is polished to decrease the thickness of the liquid crystal display panel.

The liquid crystal display panel is constituted of a TFT substrate which has pixel electrodes, thin film transistors (TFTs), and the like formed thereon or a color filter substrate which has color filters formed thereon. A glass substrate which is served for forming the TFT substrate and the color filter substrate has a thickness thereof standardized to 0.5 mm or to 0.7 mm. It is difficult to acquire such standardized glass substrate from a market. Further, an extremely thin glass substrate gives rise to drawbacks on mechanical strength, deflection, or the like in manufacturing steps thereof thus lowering a manufacturing yield rate. As a result, after forming the liquid crystal display panel using the standardized glass substrate, an outer surface of the liquid crystal display panel is polished to decrease the thickness of the liquid crystal display panel.

The reduction of the thickness of the liquid crystal display panel gives rise to a drawback on mechanical strength. That is, there exists a risk that the liquid crystal display panel is broken when mechanical pressure is applied to a display screen of the liquid crystal display panel. To prevent such breaking of the liquid crystal display panel, as illustrated in FIG. 16, in assembling the liquid crystal display panel in a set such as a mobile phone, a front window (hereinafter referred to as face plate) is mounted on a screen side of the liquid crystal display panel.

The face plate is installed at a distance from the liquid crystal display panel in order to prevent an external force applied to the face plate from extending to the liquid crystal display panel. This, however, causes a different problem in a structure illustrated in FIG. 16 by degrading the quality of a displayed image as is described later. Meanwhile, structures that mechanically protect a liquid crystal display panel have been proposed. JP 11-174417A, for example, describes mechanically protecting the liquid crystal display panel with a sticky elastic member that is installed between the face plate and the liquid crystal display panel.

The related art illustrated in FIG. 16 gives rise to a drawback that an image appears as a duplicate image. FIG. 16 is a view describing the drawback by taking a reflective liquid crystal display panel as an example. In FIG. 16, an incident external light L passes a face plate, is reflected on the liquid crystal display panel, passes the face plate again, and enters human eyes. Here, the external light L is refracted on the face plate, but the refraction is ignored in FIG. 16.

A portion of light reflected on a screen P1 of the liquid crystal display panel is reflected on a lower surface Q1 of the face plate, is incident on a screen P2 of the liquid crystal display panel, and is reflected on the screen P2 of the liquid crystal display panel. When a viewer recognizes the light reflected on the screen P2 with his/her eyes, a phenomenon that an image appears as a duplicate image occurs. The description has been made by taking the reflective liquid crystal display panel as an example in FIG. 16, but the same goes for a transmissive liquid crystal display panel. That is, in the transmissive liquid crystal display panel, when light passes the liquid crystal display panel at an angle equal to an angle of reflection light on a screen P1 of the liquid crystal display panel, light is reflected on a lower surface Q1 of a face plate, and traces a path in the same manner as a path of the reflective liquid crystal display panel. The phenomenon which makes the image appear as a duplicate image deteriorates image quality.

The technique disclosed in JP 11-174417 A, on the other hand, is of attaching the face plate to a surface of the liquid crystal display panel with a sticky elastic member interposed between the two. A face plate that is discussed in the present invention is the type on which printing is performed in layers so that the face plate bears a specific frame pattern or a graphic pattern along its perimeter for the purpose of improving the design aesthetics of the display device. A frame printed onto a face plate affects in various ways the adhesion or the pressure-sensitive adhesion between the liquid crystal display panel and the face plate. The relation between the thickness of the pressure-sensitive adhesive material and the thickness of the printed frame or the like is a particularly important matter. However, JP 11-174417 A does not mention this and relevant matters.

SUMMARY OF THE INVENTION

The present invention has been made in view of the above-mentioned circumstances, and it is therefore an object of the present invention to prevent the deterioration of a displayed image that results from the presence of an attached face plate and, at the same time, to solve the problem of the adhesion between a liquid crystal display panel and a face plate being affected by a graphic pattern that is drawn by printing or other measures along the perimeter of the face plate for the purpose of attaining improved design aesthetics.

Specific measures by which the present invention overcomes the above-mentioned problems are as follows.

(1) A liquid crystal display device with a liquid crystal display panel including: a thin film transistor substrate on which pixel electrodes and thin film transistors for controlling signals to the pixel electrodes are arranged in a matrix pattern; a color filter substrate on which color filters are formed in a manner that corresponds to the pixel electrodes; an upper polarizer; a face plate; and a frame, in which the upper polarizer is bonded to the color filter substrate, and the face plate formed of a resin is installed to the upper polarizer, with a pressure-sensitive adhesive material interposed between the upper polarizer and the face plate, in which the frame having multiple printed layers is formed along a perimeter of the face plate, and the pressure-sensitive adhesive material covers the frame, in which the pressure-sensitive adhesive material has a three-layer structure having a first pressure-sensitive adhesive member, which adheres to the face plate, a base material, and a second pressure-sensitive adhesive member, which adheres to the upper polarizer, and in which the first pressure-sensitive adhesive member is thicker than 1.4 times the second pressure-sensitive adhesive member.

(2) The liquid crystal display device according to the above-mentioned item (1), in which, when a thickness of the frame is given as TP and a thickness of the first pressure-sensitive adhesive member in other parts than where the first pressure-sensitive adhesive member overlaps with the frame is given as TA, TA is 2.5 times larger than TP or more.

(3) The liquid crystal display device according to the above-mentioned item (1), in which the first pressure-sensitive adhesive member is thicker than the second pressure-sensitive adhesive member by 20 µm or more.

(4) The liquid crystal display device according to the above-mentioned item (1), in which the frame is formed of at least three layers, and edge portions of the at least three layers in a central direction of the liquid crystal display panel are progressively shifted outward, as the at least three layers increase with distance from the face plate.

(5) The liquid crystal display device according to the above-mentioned item (1), in which the face plate is formed of an acrylic resin.

(6) A pressure-sensitive adhesive material tape including a pressure-sensitive adhesive material that bonds a liquid crystal display panel and a face plate together, in which the pressure-sensitive adhesive material has a three-layer structure having a first pressure-sensitive adhesive member, which adheres to the face plate, a base material, and a second pressure-sensitive adhesive member, which adheres to the liquid crystal display panel, in which the pressure-sensitive adhesive material is sandwiched between a first separator, which is attached to a first pressure-sensitive adhesive member side, and a second separator, which is attached to a second pressure-sensitive adhesive member side, and in which the first separator is outwardly distinguishable from the second separator.

(7) The pressure-sensitive adhesive material tape according to the above-mentioned item (6), in which the first separator and the second separator have different profile sizes.

(8) The pressure-sensitive adhesive material tape according to the above-mentioned item (6), in which the first separator and the second separator have different colors and machined shapes.

(9) The pressure-sensitive adhesive material tape according to the above-mentioned item (6), in which the first pressure-sensitive adhesive member has a thickness 1.4 times a thickness of the second pressure-sensitive adhesive member or more.

The present invention makes it possible to bond the face plate made of glass to the liquid crystal display panel while considerably lessening image quality degradation that is caused by reflection at the interface between the face plate and the liquid crystal display panel. The present invention also ensures that the adhesion between the face plate and the liquid crystal display panel is steady despite the presence of the frame formed along the perimeter of the face plate by printing for the purpose of attaining improved design aesthetics.

In addition, using the three-layer structure pressure-sensitive adhesive member that has the first pressure-sensitive adhesive member, the base, and the second pressure-sensitive adhesive member as a pressure-sensitive adhesive material for bonding the face plate to the liquid crystal display panel, the present invention makes it possible to salvage and reuse the liquid crystal display panel, the face plate, and other components even when a defect in bonding between the face plate and the liquid crystal display panel calls for repairs.

BRIEF DESCRIPTION OF THE DRAWINGS

In the accompanying drawings:

FIG. 2 is a sectional view taken along the line II-II of FIG. 1;

DETAILED DESCRIPTION OF THE INVENTION

The present invention is described in detail in conjunction with embodiments.

First Embodiment

Figure 1:
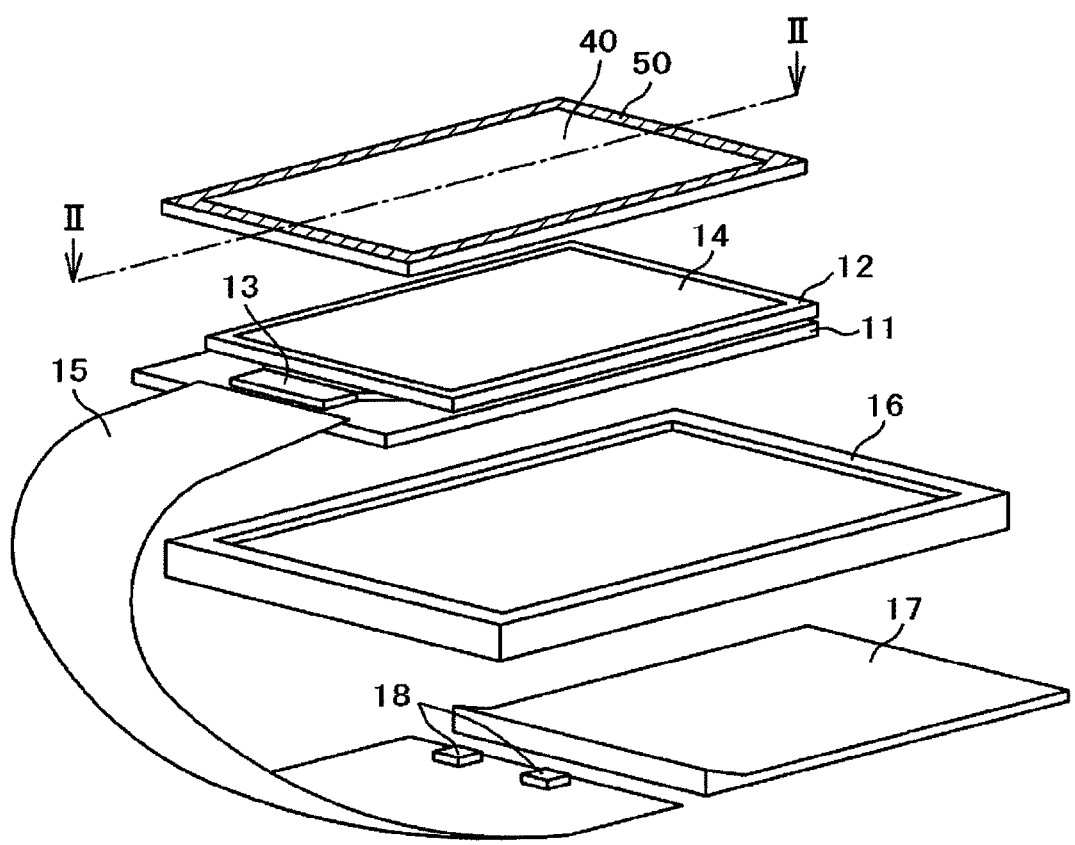
FIG. 1 is an exploded perspective view of a liquid crystal display device that embodies the present invention.

FIG. 1 is an exploded perspective view illustrating a liquid crystal display device according to a first embodiment of the present invention. FIG. 2 is a sectional view taken along the line II-II of FIG. 1. In FIG. 1, a liquid crystal display panel is constituted of a TFT substrate 11 and a color filter substrate 12. Pixel electrodes are formed on the TFT substrate 11 in matrix. Thin film transistors (TFTs) for changing over a signal supplied to respective pixel electrodes are also formed on the TFT substrate 11. The color filter substrate 12 which has color filters formed thereon is arranged to face the TFT substrate 11 in an opposed manner.

Respective thicknesses of glass substrates used in the manufacture of the TFT substrate 11 and the color filter substrate 12 are set to 0.5 mm. After completion of manufacturing of the liquid crystal display panel by charging and sealing liquid crystal between the substrates, outer sides of the liquid crystal display panel are polished so as to reduce a thickness of the whole liquid crystal display panel. In this embodiment, a thickness of the liquid crystal display panel after polishing is approximately 0.6 mm. That is, the thicknesses of the respective glass substrates are decreased by 0.2 mm by polishing.

The TFT substrate 11 is larger than the color filter substrate 12 in size, and a drive IC 13 and a flexible printed circuit board 15 are mounted on a portion of the TFT substrate 11 where the color filter substrate 12 does not overlap with the TFT substrate 11. The liquid crystal display panel is housed in a resin mold 16 so that the liquid crystal display panel is mechanically protected. A portion of the liquid crystal display panel where the TFT substrate 11 and the color filter substrate 12 overlap with each other is mechanically strong, but a portion of the liquid crystal display panel which is constituted of only the TFT substrate 11 is mechanically weak. Accordingly, the liquid crystal display panel adopts the mold 16 structure for preventing an impact from being applied to such a mechanically weak portion.

A backlight is set under the mold 16. FIG. 1 illustrates only a light guide plate 17 out of the components of the backlight. To elaborate, various optical sheets which are, in practice, set between the liquid crystal display panel and the light guide plate 17 are omitted from FIG. 1. The flexible printed circuit board 15 is bent around the mold 16 toward the backside of the mold 16 to be set under the backlight. Attached to the flexible printed circuit board 15 are light emitting diodes (LEDs) 18, which serve as the light source of the backlight. The LEDs 18 are placed by a side surface of the light guide plate 17. In addition to the LEDs 18 and a power source for the LEDs 18, a power source for driving the liquid crystal display panel, and wiring lines used as scanning lines, data signal lines, and the like are provided on the flexible printed circuit board 15.

In FIG. 1, an upper polarizer 14 is set on the top surface of the liquid crystal display panel. A face plate 30 is placed over the upper polarizer 14. The face plate 30 is made of an acrylic resin and has a thickness of 1.8 mm. Being thicker than the liquid crystal display panel and made of an acrylic resin which is hard to crack, the face plate 30 has enough mechanical strength to protect the liquid crystal display panel. Other resin materials that are used as a face plate include polycarbonate.

A frame is formed by printing along the perimeter of the face plate 30 as illustrated in FIG. 1. The color of the frame may be an achromatic color such as black or white, or may be a chromatic color such as red. A graphic pattern, letters, or the like is drawn in the frame part by forming layers of different colors by printing. The total count of the printed layers is two layers or more and no more than five layers in most cases.

With multiple layers formed by printing, the part on which the layers are printed grows thick. A face plate in the present invention is bonded to a liquid crystal display panel with, as is described later, a pressure-sensitive adhesive material instead of an adhesive material that adheres by solidifying (throughout this specification, the term "adhesive material" refers to the type that exerts its bonding effect to the fullest when solidified, as opposed to "pressure-sensitive adhesive material" which is very sticky from the beginning and adheres without solidifying or otherwise changing its state). When a pressure-sensitive adhesive material is used, a thick printed frame may make the adhesion between the face plate and the liquid crystal display panel defective, depending on the relation between the thickness of the pressure-sensitive adhesive material and the thickness of the printed frame.

FIG. 2 is a sectional view taken along the line II-II of FIG. 1 and also is an exploded sectional view. In the actual structure, the liquid crystal display panel and the backlight are housed in the inside of the mold 16. The face plate 30 is adhered to the liquid crystal display panel. In FIG. 2, the TFT substrate 11 and the color filter substrate 12 are arranged with a gap of several µm therebetween, and the liquid crystal 100 is sandwiched between the TFT substrate 11 and the color filter substrate 12. A sealing material 19 is arranged on peripheries of the TFT substrate 11 and the color filter substrate 12 and the liquid crystal 100 is sealed inside the sealing material 19.

On the TFT substrate 11, in addition to the pixel electrodes and the TFTs, scanning lines, data signal lines, and the like are arranged. Those wiring lines extend to the outside after penetrating the sealing material 19, and are connected to the drive IC 13 or the flexible printed circuit board 15. The flexible printed circuit board 15 extends to a position behind the backlight. The LEDs 18 mounted on the flexible printed circuit board 15 are arranged on a side surface of the light guide plate 17 and serve as the light source of the backlight. A plurality of LEDs 18 are mounted on the flexible printed circuit board 15.

In FIG. 2, the light guide plate 17 plays a role of directing the light from the LEDs 18 arranged on the side surface thereof toward a liquid-crystal-display-panel side. A reflection sheet 25 is provided to direct the light which advances downwardly from the light guide plate 17 toward the liquid-crystal-display-panel side. A lower diffusion sheet 21 is arranged on the light guide plate 17. The plurality of LEDs 18 are arranged on the side surface of the light guide plate 17, but a gap exists between the LEDs 18 and the side surface of the light guide plate 17 and hence, light which advances upwardly from the light guide plate 17 becomes non-uniform. That is, a portion of the light guide plate 17 in the vicinity of the LEDs 18 becomes brighter than other portions of the light guide plate 17. The lower diffusion sheet 21 is provided to cope with such non-uniformity of light and plays a role of making the light advancing upwardly from the light guide plate 17 uniform.

A lower prism sheet 22 is arranged on the lower diffusion sheet 21. A large number of prisms which extend in the lateral direction of a screen are formed on the lower prism sheet 22 at fixed intervals, for example, at intervals of approximately 50 µm. Due to such prisms, light which is emitted from the light guide plate 17 focuses the light which tends to spread in the longitudinal direction of the screen in the direction perpendicular to the liquid crystal display panel. An upper prism sheet 23 is arranged on the lower prism sheet 22. A large number of prisms which extend in the direction orthogonal to the prisms formed on the lower prism sheet 22, that is, in the longitudinal direction of the screen, are formed on the upper prism sheet 23 at fixed intervals, for example, at intervals of approximately 50 µm. Due to such prisms, light which is emitted from the light guide plate 17 focuses the light which tends to spread in the lateral direction of the screen in the direction perpendicular to the liquid crystal display panel. In this manner, with the use of the lower prism sheet 22 and the upper prism sheet 23, it is possible to focus the light which tends to spread in the longitudinal direction as well as in the lateral direction of the screen in the direction perpendicular to the screen. That is, with the use of the lower prism sheet 22 and the upper prism sheet 23, it is possible to increase the front brightness.

An upper diffusion sheet 24 is arranged on the upper prism sheet 23. The prisms which extend in the fixed direction are arranged on the prism sheets at intervals of 50 µm, for example. That is, bright and dark stripes are formed at intervals of 50 µm. On the other hand, on the liquid crystal display panel, scanning lines are formed in the lateral direction of the screen at fixed intervals, and data signal lines are formed in the longitudinal direction of the screen at fixed intervals. Accordingly, the interference occurs between the scanning lines and the lower prism sheet 22 or between the data signal lines and the upper prism sheet 23 thus generating moiré. The upper diffusion sheet 24 plays a role of reducing this moiré by making use of a diffusion effect.

Light exiting the upper diffusion sheet 24 enters the lower polarizer 20, which is bonded to the liquid crystal display panel, to be polarized. The transmittance of the polarized light is controlled by the liquid crystal on a pixel basis in the liquid crystal display panel, and an image is thus formed. Light exiting the liquid crystal display panel is polarized again by the upper polarizer 14 and recognized by the human eye. The face plate 30 is placed on top of the upper polarizer 14. The face plate 30 in the present invention is made of an acrylic resin.

Figure 16:
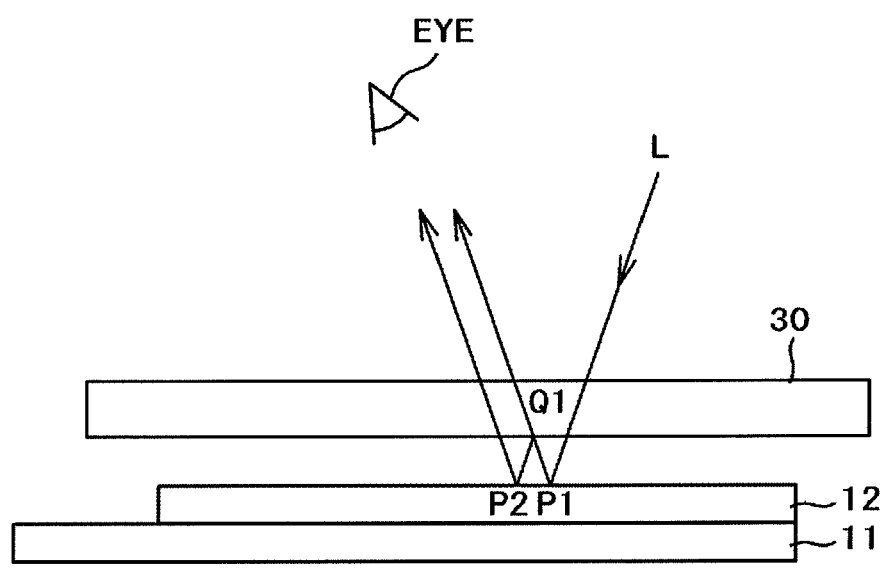
FIG. 16 is a diagram illustrating a face plate and a liquid crystal display panel of related art in relation to each other.

The face plate 30 can be installed to the liquid crystal display panel by two ways: one is to use an adhesive material (meaning the type that adheres by solidifying, see [0030]) and the other is to use a pressure-sensitive adhesive material. FIG. 16 illustrates a problem in using an adhesive material to install the face plate 30 to the liquid crystal display panel. In FIG. 16, a frame is formed by printing multiple times. The multiple printing uses a different color each time and is performed on the same spot in an overlapping manner. In the case of printing five layers, for example, the thickness of the printed frame is about 40 µm.

The adhesive material used is an ultraviolet-curable resin. An adhesive material made of an ultraviolet-curable resin is initially liquid and, when irradiated with ultraviolet rays, cured to bond. The adhesive material in its initial liquid state cannot form a thick coat. Increasing the viscosity of the liquid before UV curing makes applying the adhesive material thick possible, but makes the adhesive material difficult to apply in a manner required in mass production.

Figure 17A:
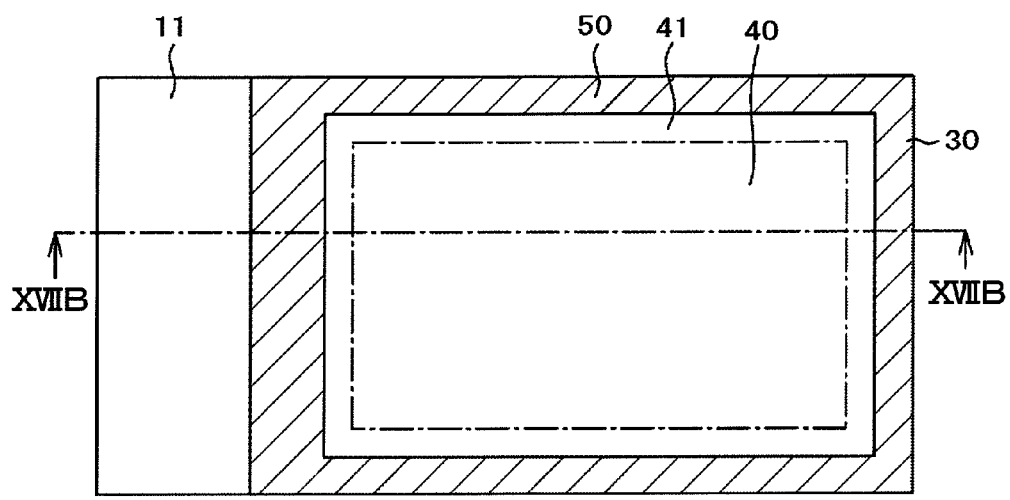
FIGS. 17A and 17B are diagrams illustrating a problem in bonding the face plate and the liquid crystal display panel with an adhesive material.
Figure 17B:
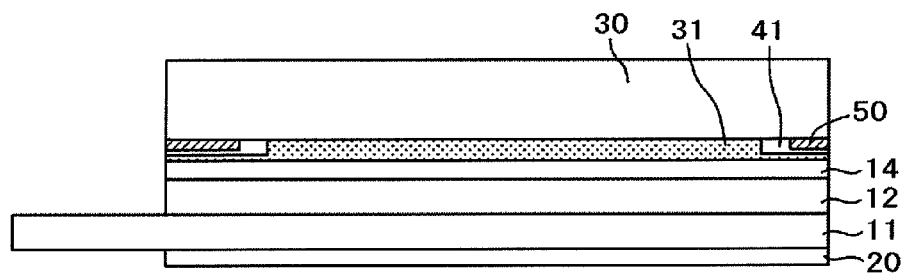

In order to keep the adhesive material fit for use in mass production, the upper limit of the viscosity of the adhesive material is 7,000 to 12,000 mPa·s. The adhesive material at this viscosity is about 50 µm in thickness after cured with UV rays. The adhesive material is applied to the face plate by printing, and leveling in the course of printing the adhesive material reduces the thickness of the adhesive material in the frame part. The reduced thickness of the adhesive material in the frame part means weak adhesion in the frame part and, when a cyclic heating-cooling test or the like is conducted, causes the adhesive material to peel in the frame part and inside the frame part, leaving air bubbles. FIGS. 17A and 17B illustrate this state.

FIG. 17A is a plan view of a hybrid panel in which the peeling problem has occurred. FIG. 17B is a sectional view taken along the line XVIIB-XVIIB of FIG. 17A. In FIGS. 17A and 17B, the adhesive material is thin in the frame part and, when the face plate peels in this part, the effect spreads over to a peeling area 41, which is indicated by the dot-dash line of FIG. 17A. A sectional view illustrating a state in which the peeling has progressed from the frame to the inner area thereof is FIG. 17B.

Figure 18:
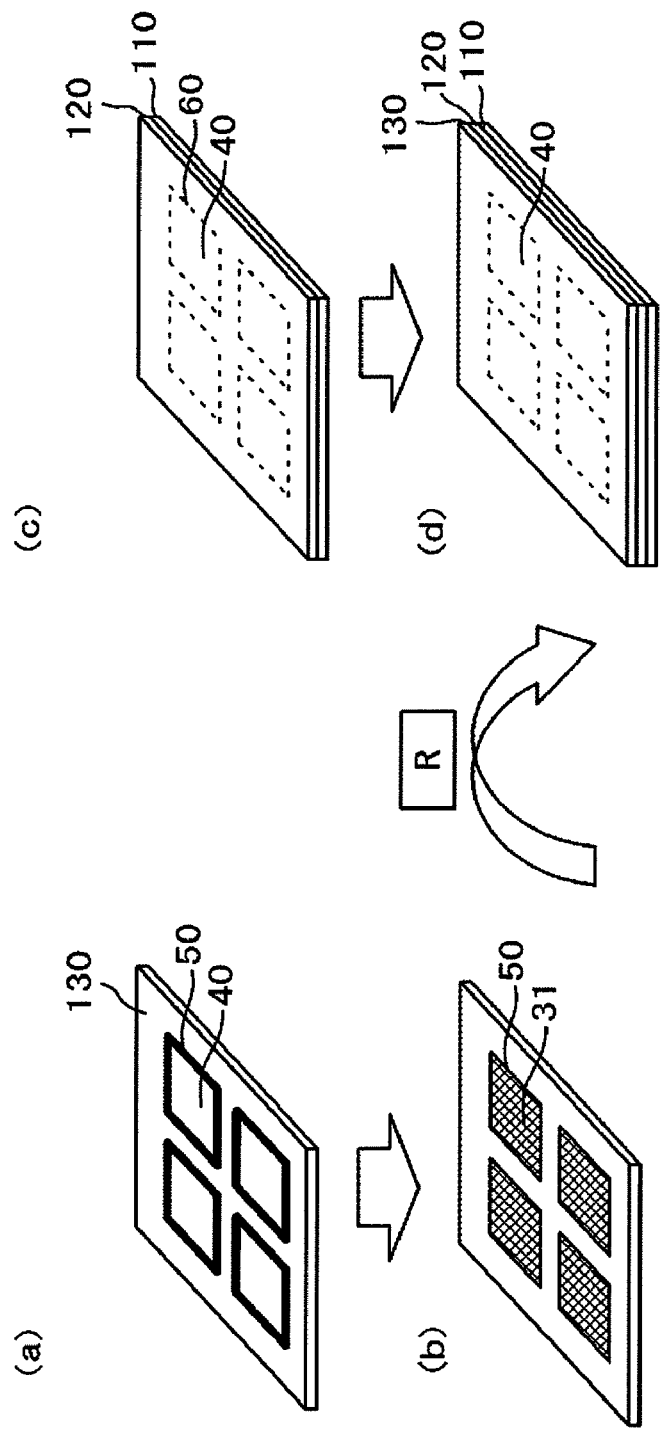
FIG. 18 are diagrams illustrating an example of how the face plate and the liquid crystal display panel are bonded with the use of an adhesive material.

FIG. 18 are schematic diagrams illustrating steps of forming the hybrid liquid crystal display panel of FIGS. 17A and 17B which combines a liquid crystal display panel and a face plate. FIGS. 18(a) and 18(b) illustrate steps for the face plate, FIG. 18(c) illustrates the liquid crystal display panel, and FIG. 18(d) illustrates a state in which the liquid crystal display panel and the face plate are stuck to each other. As illustrated in FIG. 18, the face plate is cut out of a mother face plate where multiple face plates are formed. The liquid crystal panel, too, is a combination of a TFT substrate cut out of a mother TFT substrate where multiple TFT substrates are formed and a color filter substrate cut out of a mother color filter substrate where multiple color filter substrates are formed. FIG. 18 illustrate an example in which four face plates are formed from one mother plate and four liquid crystal display panels are formed from one pair of mother substrates.

Figure 19:
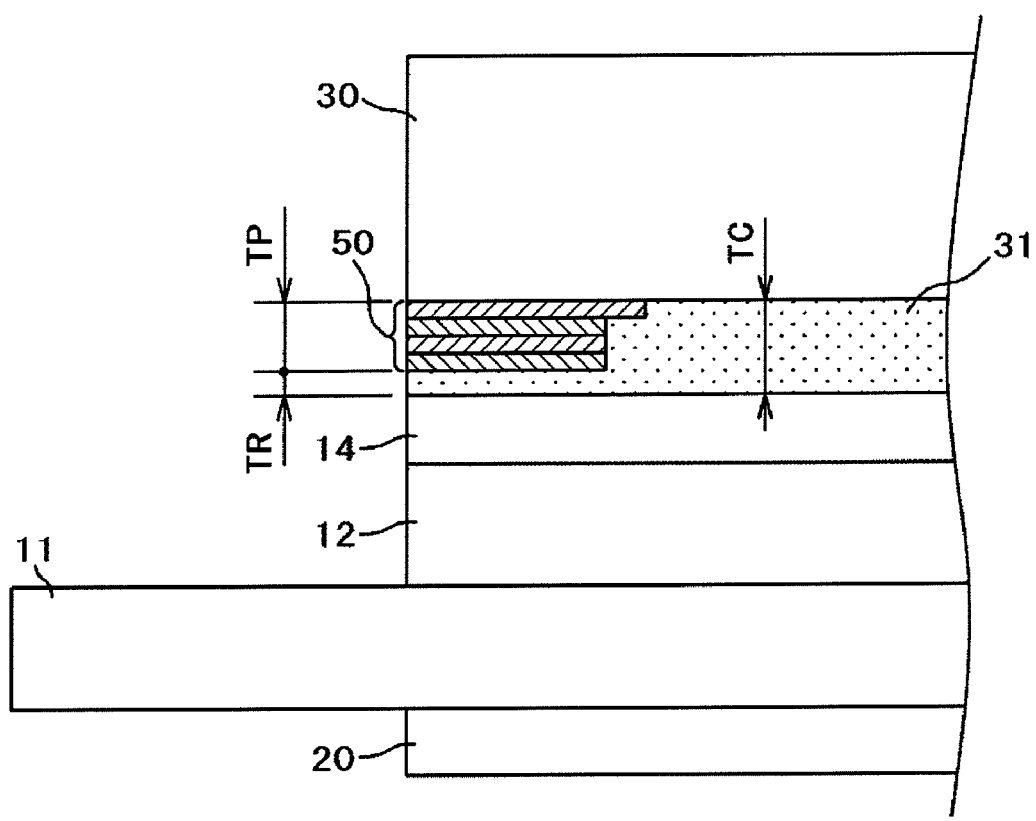
FIG. 19 is an explanatory diagram of a problem in using an adhesive material to bond the face plate and the liquid crystal display panel.

In FIG. 18(a), ink is applied by printing to form frames on the mother face plate. The frames each have, for example, four layers formed by applying ink of different colors as illustrated in FIG. 19. The ink layers are approximately 40 µm thick in total. After the printing, the mother face plate is dried under a specific condition in order to solidify the ink. Thereafter, as illustrated in FIG. 18(b), a UV-curable resin is applied by printing to the display area and frame part of each face plate. The UV-curable resin is liquid during the printing, and the surface of the printed UV-curable resin is made flat by leveling.

The liquid crystal display panel is formed separately from the face plate as illustrated in FIG. 18(c). TFT substrates for four liquid crystal display panels are formed in a mother TFT substrate, and color filter substrates for four liquid crystal display panels are formed in a mother color filter substrate. The dotted lines of FIG. 18(c) indicate sealing parts 60 for sealing the TFT substrates and the color filter substrates to each other. A liquid crystal is introduced and sealed inside the sealing parts 60. Dripping or suction can be used to introduce the liquid crystal. Four liquid crystal display panels are thus formed in a pair of mother substrates.

The mother face plate formed as illustrated in FIG. 18(b) is flipped to be bonded to the mother color filter substrate of the mother liquid crystal display panel formed in FIG. 18(c). "R" of FIGS. 18 indicates that the mother face plate is flipped. The mother face plate and the mother color filter substrate are bonded together by the UV adhesive material which has been applied to the mother face plate. This bonding step is executed in a reduced-pressure atmosphere in order to avoid trapping air in the bonded part. The UV adhesive material is subsequently irradiated with UV light to be solidified, and is checked for air bubbles and the like.

A peripheral part of the thus formed hybrid liquid crystal display panel is illustrated in section in FIG. 19. In FIG. 19, the thickness of an adhesive material 31 is 50 µm, except in a part where a frame 50 is formed and the adhesive material 31 has a reduced thickness due to surface leveling that takes place when the adhesive material 31 is applied. As a result, the thickness of the adhesive material 31 under the frame 50 is about 10 µm, or may be 10 µm or less if there are fluctuations. When this hybrid liquid crystal display panel is cyclically heated and cooled at −40° C. to 85° C. or so, especially when the face plate 30 is made of acrylic or other types of resin which are large in thermal expansion coefficient, the thermal expansion and contraction of the face plate 30 cause stress on the adhesive material 31 under the frame 50 until the adhesive material 31 peels as illustrated in FIGS. 17A and 17B. Increasing the overall thickness of the adhesive material 31 makes the adhesive material 31 under the frame 50 thick as well, but enhancing the viscosity of the adhesive material 31 in order to increase the adhesive material thickness makes the adhesive material 31 difficult to apply in a manner required in mass production.

Figure 3A:
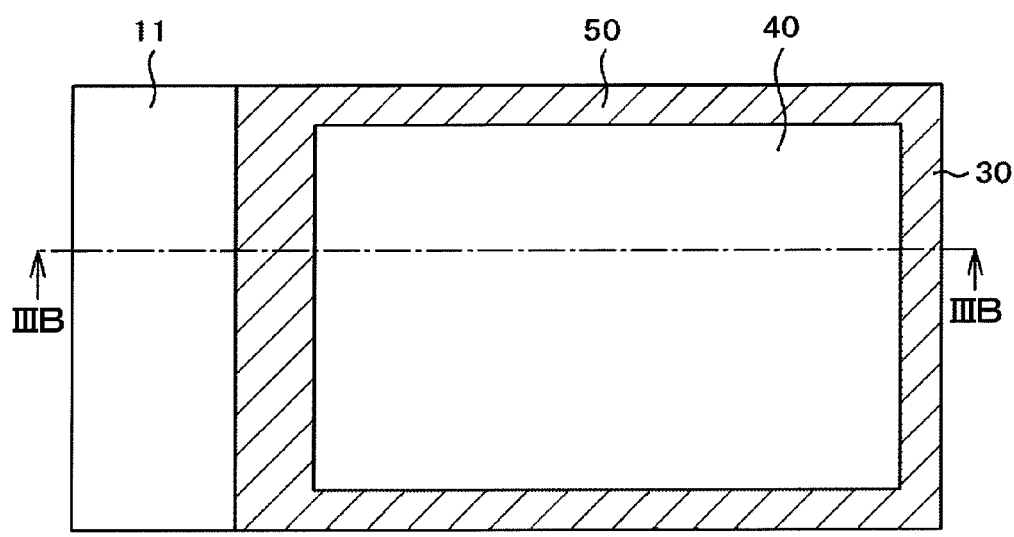
FIGS. 3A and 3B are diagrams illustrating a liquid crystal display panel with a face plate attached thereto.
Figure 3B:
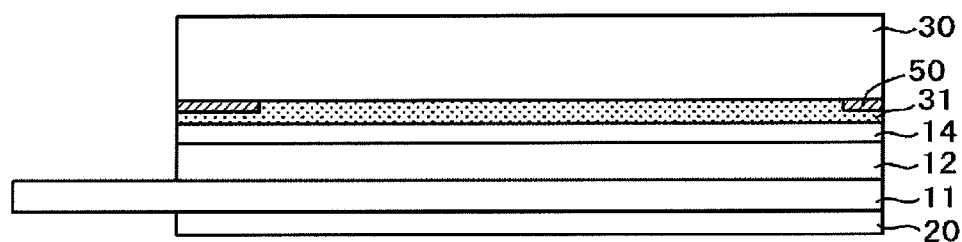

FIGS. 3A and 3B are diagrams in which the face plate 30 and a liquid crystal display panel are assembled together according to the present invention. Hereinafter, a combination of the face plate 30 and a liquid crystal display panel is referred to as hybrid liquid crystal display panel. FIG. 3A is a plan view of the hybrid liquid crystal display panel. In FIG. 3A, the frame 50 is formed along the perimeter of the face plate 30. Inside the frame 50 is a display area 40. FIG. 3B is a sectional view taken along the line IIIB-IIIB of FIG. 3A. In FIG. 3B, the face plate 30 and the liquid crystal display panel are bonded to each other with a pressure-sensitive adhesive material 35. The face plate 30 is actually adhered by interposing the pressure-sensitive adhesive material 35 between the face plate 30 and the upper polarizer 14 of the liquid crystal display panel.

The frame 50 of FIG. 3B is actually formed from five layers of printing. The thickness of the printed frame 50 in this case is 40 μm. The thickness of the pressure-sensitive adhesive material 35 is 175 μm. The pressure-sensitive adhesive material 35 before being put into use is protected by separators. After removing the separators, the pressure-sensitive adhesive material 35 is placed on the face plate 30 or the liquid crystal display panel, and then the face plate 30 and the liquid crystal display panel are bonded together.

Figure 4:
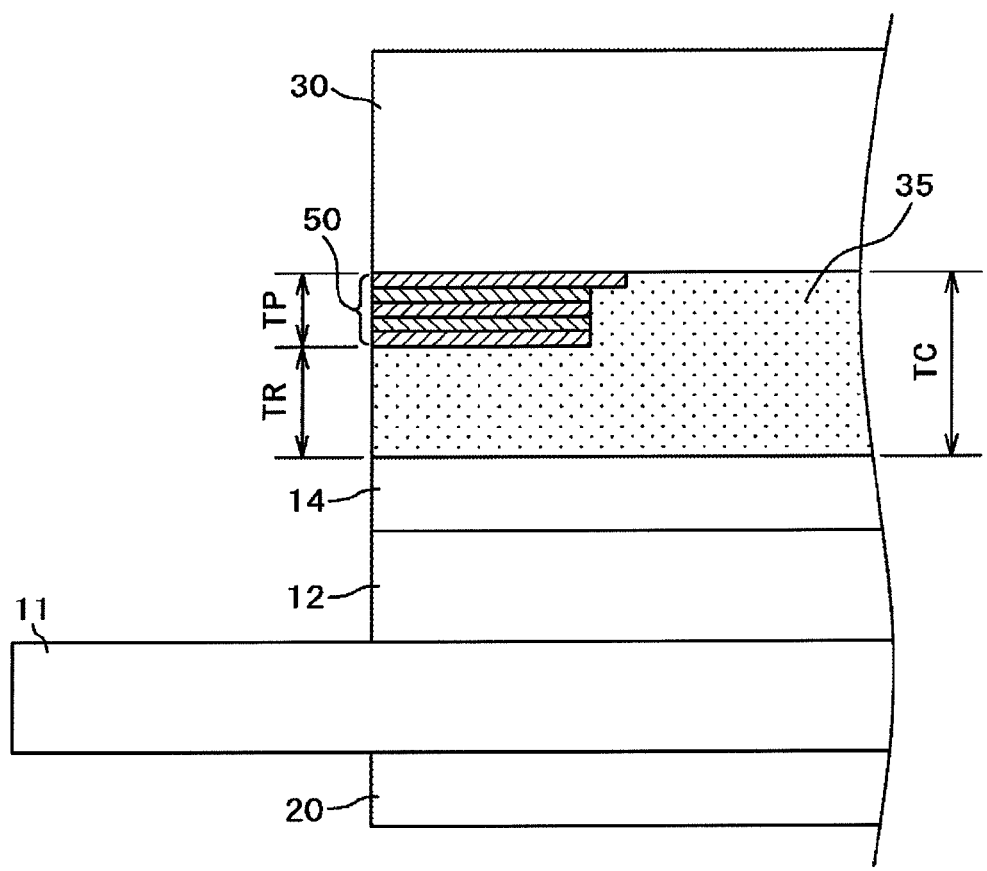
FIG. 4 is a detailed sectional view of the liquid crystal display panel with the attached face plate.

FIG. 4 is a detailed sectional view of the frame 50 and surrounding part of the hybrid liquid crystal display panel illustrated in FIGS. 3A and 3B. In FIG. 4, the frame 50 is formed from five layers of printing. A total thickness TP of the printed frame 50 is, for example, 40 μm. The thickness of the pressure-sensitive adhesive material 35 is 175 μm in this embodiment. When the pressure-sensitive adhesive material 35 is put in place to bond the face plate 30 and the liquid crystal display panel together, the thickness of the pressure-sensitive adhesive material 35 under the frame 50 is reduced compared to the rest of the pressure-sensitive adhesive material 35. Specifically, when a thickness TC of the pressure-sensitive adhesive material 35 in the display area 40 is 175 μm and the thickness TP of the printed frame 50 is 40 μm, a thickness TR of the pressure-sensitive adhesive material 35 under the frame 50 is 135 μm.

Subjecting the hybrid liquid crystal display panel structured as illustrated in FIG. 4 to a cyclic heating-cooling test at −40° C. to 85° C. has not caused the face plate 30 to peel off of the liquid crystal display panel. This is because the pressure-sensitive adhesive material 35 under the frame 50 formed on the face plate 30 maintains a thickness of about 135 μm as well as the rest of the pressure-sensitive adhesive material 35. According to an experiment, the face plate 30 has not peeled off of the liquid crystal display panel in a cyclic heating-cooling test at −40° C. to 85° C. when the thickness of the pressure-sensitive adhesive material 35 is 2.5 times the total thickness of the printed frame 50 or more.

Figures 5A, 5B:
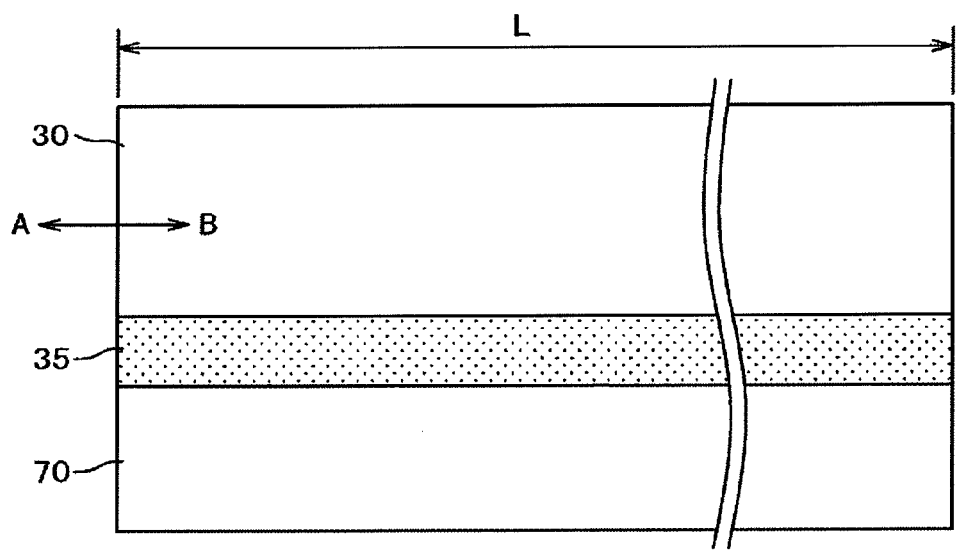
FIGS. 5A and 5B are diagrams illustrating an evaluation of thermal expansion of the face plate.

Peeling in a cyclic heating-cooling test is mainly due to the thermal expansion and contraction of the fame plate 30. In other words, when the face plate 30 is made of glass or other materials that are small in thermal expansion coefficient, the frame 50 is not likely to peel. FIGS. 5A and 5B illustrate an evaluation of a thermal expansion difference at −40° C. to 85° C. between the face plate 30 that is made of glass and the face plate 30 that is made of an acrylic resin.

FIGS. 5A and 5B provide a rough standard for evaluating stress that the pressure-sensitive adhesive material 35 receives when the face plate 30 is bonded to a substrate 70, which has a small thermal expansion coefficient, with the pressure-sensitive adhesive material 35 interposed therebetween. In FIGS. 5A and 5B, a length L of the face plate 30 is 61.6 mm. In FIG. 5B, TC represents a thermal expansion coefficient. The thermal expansion coefficient of glass is $8.7 \times 10^{-6}$, and the thermal expansion coefficient of an acrylic resin is $7 \times 10^{-5}$. In this case, the thermal expansion coefficient amount in the longitudinal direction of the face plate 30 when the temperature rises from −40° C. to 85° C. is given as ΔL. ΔL of the face plate 30 is 65 μm when made of glass, and is 520 μm when made of an acrylic resin. Thus, the thermal expansion difference ("difference" of FIG. 5B) between the acrylic face plate 30 ("acrylic plate" of FIG. 5B) and the glass face plate 30 ("glass plate" of FIG. 5B) is 455 μm.

The evaluation of FIGS. 5A and 5B is a simplified model where the thermal expansion of the pressure-sensitive adhesive material 35 and the thermal expansion of the substrate 70 are not taken into account, but the model provides some standard for evaluating how stress on the pressure-sensitive adhesive material 35 or the adhesive material 31 is varied depending on the material of the face plate 30.

Figure 6A:
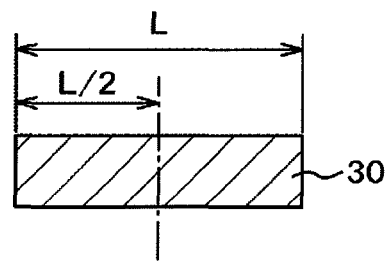
FIGS. 6A and 6B are diagrams illustrating the thermal expansion of the face plate in relation to a screen size.
Figure 6B:
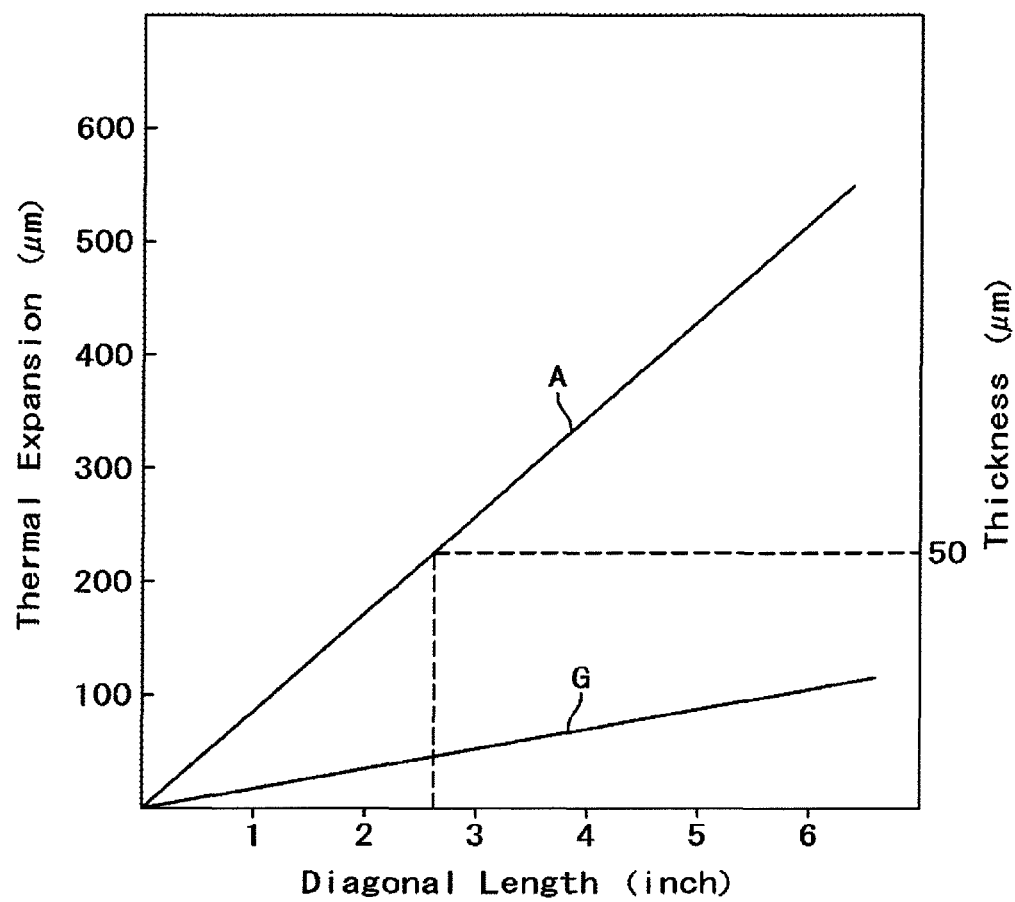

FIGS. 6A and 6B illustrate an evaluation of what material can be used for the face plate 30 in relation to the screen size. In FIGS. 6A and 6B, the horizontal axis represents the diagonal size ("diagonal length" of FIG. 6B) of a cellular phone screen. The vertical axis on the left hand side represents a thermal expansion amount ("thermal expansion" of FIG. 6B) at a half the dimension of a long side, which corresponds to the diagonal size. The vertical axis on the right hand side represents the thickness of the adhesive material film or the pressure-sensitive adhesive material film ("thickness" of FIG. 6B). The thermal expansion amount is measured at a half the long-side dimension on the assumption that, since the face plate 30 expands leftward and rightward from the center, thermal stress on one side of the face plate 30 is caused by the thermal expansion amount of a half of the face plate 30. In FIGS. 6A and 6B, a line Are presents the thermal expansion and the thickness when the material of the face plate 30 is an acrylic resin, whereas a line G represents the thermal expansion and the thickness when the material of the face plate 30 is glass.

According to an experiment, the adhesive material 31 or pressure-sensitive adhesive material 35 having a thickness of 50 μm starts to peel when the thermal expansion amount of the face plate 30 exceeds 220 μm. In FIGS. 6A and 6B, the thermal expansion amount of the face plate 30 that is made of glass remains 200 μm or less before and after the screen size exceeds 6 inch. Therefore, when glass is employed as the face plate 30, the adhesive material 31 can be used to bond the face plate 30 and the liquid crystal display panel to each other.

On the other hand, the thermal expansion amount of the face plate 30 that is made of an acrylic resin is large and exceeds 220 μm when the diagonal size is 2.6 inch. Since the thickness of the applied adhesive material coat that is practical in mass production is about 50 μm at maximum, using an adhesive material to bond the face plate and the liquid crystal display panel to each other when the screen size is 2.6 inch or larger is difficult considering the reliability of the adhesion. Accordingly, when the screen size is 2.6 inch or larger and an acrylic resin face plate is employed, the present invention needs to be applied. While the evaluation of FIGS. 6A and 6B is made about the acrylic resin face plate 30, the above-mentioned theory is applicable to a case where the material of the face plate 30 is polycarbonate, which has a thermal expansion coefficient only slightly different from that of an acrylic resin.

Second Embodiment

Figure 7:
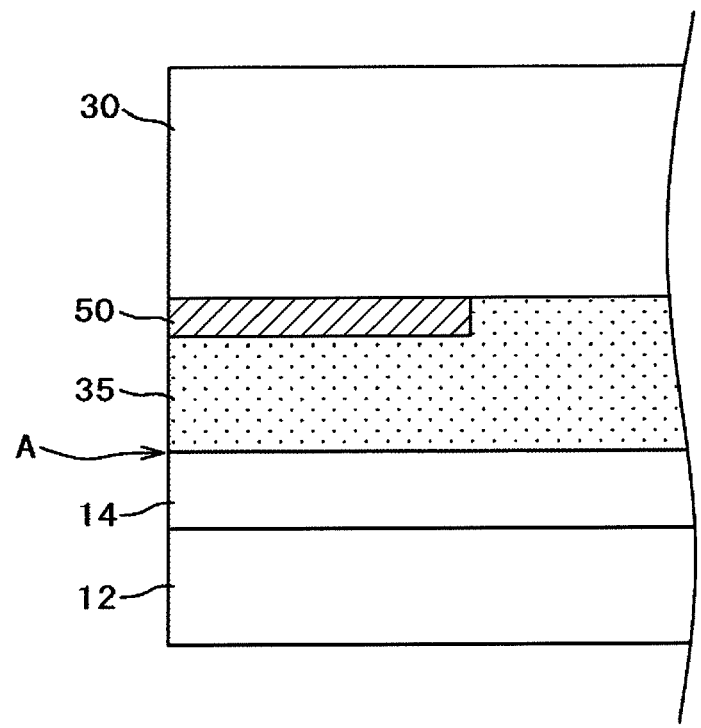
FIG. 7 is a diagram illustrating how repairs are made.

Sometimes air bubbles are trapped when the face plate 30 is bonded to the liquid crystal display panel, or the bonding fails in other respects, resulting in defective products. In such cases, the face plate 30 is peeled off of the liquid crystal display panel in order to salvage the face plate 30 and the liquid crystal display panel. To separate the liquid crystal display panel and the face plate 30 from each other, a thin, thread-like material is inserted between one of the two surfaces of the pressure-sensitive adhesive material 35 and a surface that is in contact with this surface. For example, the thin, thread-like material is inserted in a part A of FIG. 7.

Figure 8A:
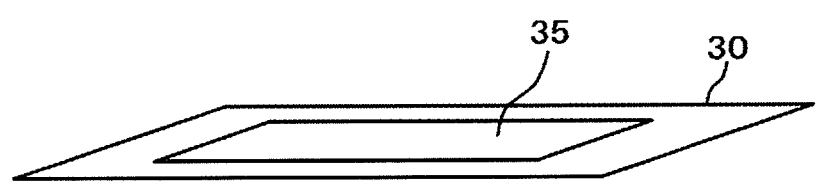
FIGS. 8A and 8B are diagrams illustrating a problem in repairs.
Figure 8B:
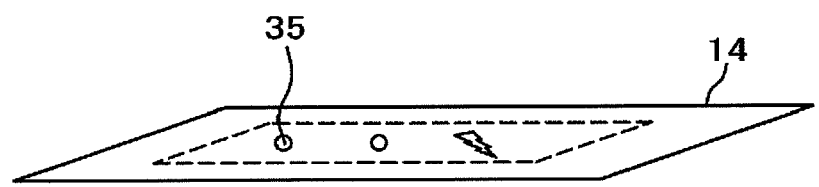

The face plate 30 and the liquid crystal display panel after separated from each other are illustrated in FIGS. 8A and 8B. FIG. 8A illustrates the face plate 30 with the pressure-sensitive adhesive material peeled off, and FIG. 8B illustrates the upper polarizer 14 of the liquid crystal display panel with the pressure-sensitive adhesive material peeled off. The pressure-sensitive adhesive material 35 is actually adhered to the upper polarizer 14. When pulled off at the interface A of FIG. 7, the pressure-sensitive adhesive material 35 remains uniformly on the face plate 30 as illustrated in FIG. 8A. The pressure-sensitive adhesive material 35 in a state of FIG. 8A is easy to pull off.

On the liquid crystal display panel side, or on the upper polarizer 14 side, to be exact, the pressure-sensitive adhesive material 35 remains in places as illustrated in FIG. 8B. The pressure-sensitive adhesive material 35 remaining in a pattern as the one illustrated in FIG. 8B is difficult to remove. Therefore, the upper polarizer 14 that has the pressure-sensitive adhesive material 35 remaining in a pattern as the one illustrated in FIG. 8B has conventionally been discarded. In the case where the pressure-sensitive adhesive material 35 is pulled off at the interface between the face plate 30 and the pressure-sensitive adhesive material 35 instead of the interface A in FIG. 7, the pressure-sensitive adhesive material 35 remains in places on the face plate 30 side and it is the face plate 30 that is discarded. Employing the pressure-sensitive adhesive material 35 thus involves a problem in that the material salvage yield is low.

Figure 9:
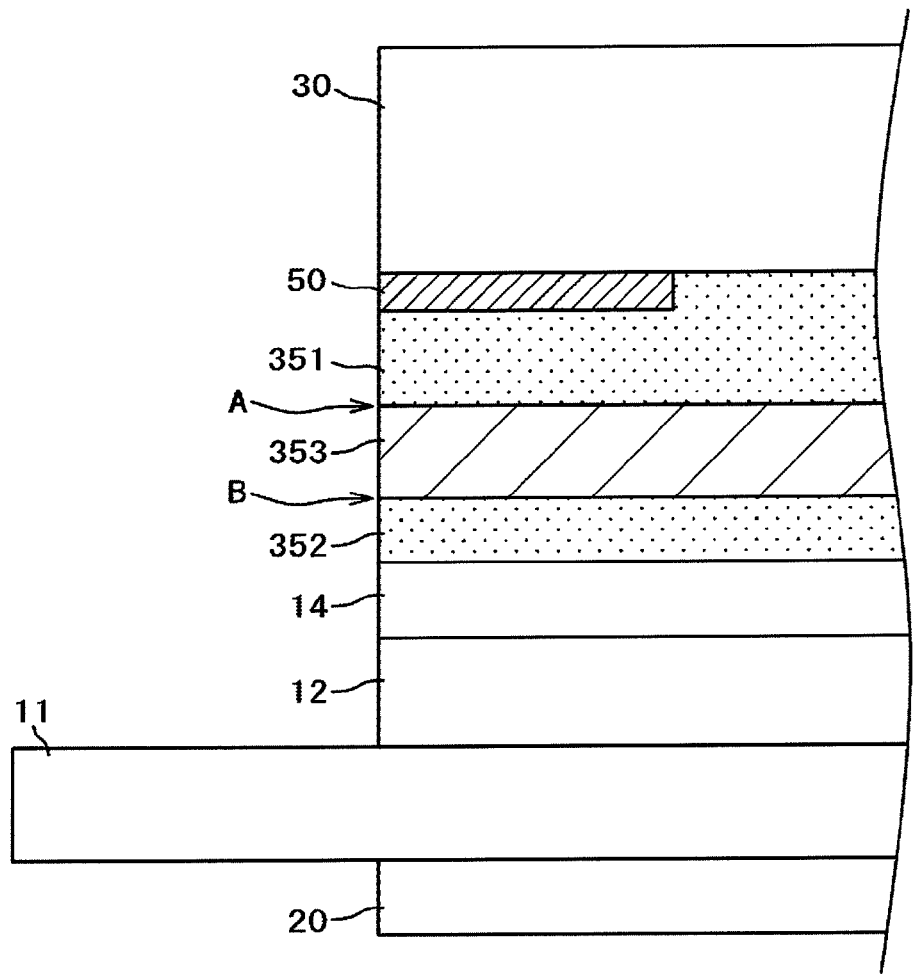
FIG. 9 is a diagram illustrating how repairs are made according to a second embodiment of the present invention.

FIG. 9 is a sectional view illustrating how the face plate 30 and the liquid crystal display panel are bonded to each other in this embodiment. In FIG. 9, the face plate 30 is bonded to the upper polarizer 14 of the liquid crystal display panel with the pressure-sensitive adhesive material 35 interposed therebetween. The frame 50 is formed by printing along the perimeter of the face plate 30. The pressure-sensitive adhesive material 35 bonding the face plate 30 and the liquid crystal display panel together in FIG. 9 is characterized by being divided into three layers: a first pressure-sensitive adhesive member 351, which adheres to the face plate 30, a base material 353, which is formed of polyethylene terephthalate (PET), and a second pressure-sensitive adhesive member 352. The first pressure-sensitive adhesive member 351 is thicker than the second pressure-sensitive adhesive member 352.

To salvage a hybrid liquid crystal display panel structured as illustrated in FIG. 9, the face plate 30 and the liquid crystal display panel are separated from each other at an interface A or B of FIG. 9 with the use of a thin thread or the like. In this case, continuous films of the pressure-sensitive adhesive material remain on the face plate 30 and on the liquid crystal display panel, namely, the upper polarizer 14, irrespective of whether the separation takes place at the interface A or at the interface B of FIG. 9. This state is illustrated in FIGS. 10A and 10B.

Figure 10:
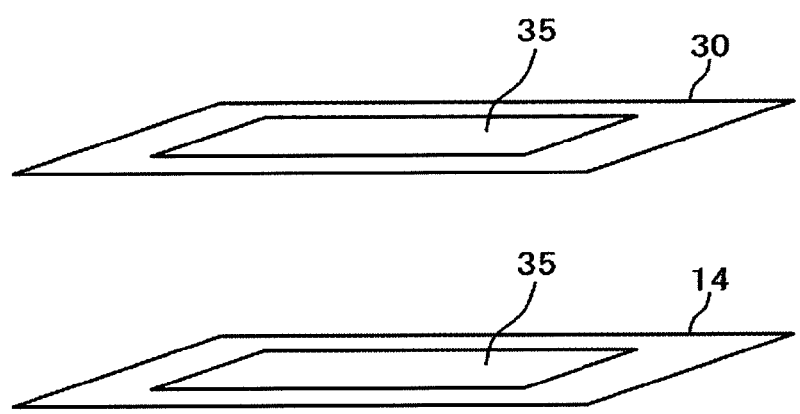
FIG. 10 is two diagrams illustrating the face plate under repair according to the second embodiment of the present invention.

FIG. 10A illustrates the pressure-sensitive adhesive material 35 that remains on the face plate 30 after the face plate 30 and the liquid crystal display panel are separated from each other. The pressure-sensitive adhesive material 35 remains in a uniform manner. FIG. 10B illustrates the pressure-sensitive adhesive material 35 that remains on the liquid crystal display panel, namely, the upper polarizer 14 after the face plate 30 and the liquid crystal display panel are separated from each other. The pressure-sensitive adhesive material 35 remains in a uniform manner on the upper polarizer 14 as well. With the pressure-sensitive adhesive material 35 remaining in a uniform manner on the face plate 30 and the upper polarizer 14 both, peeling the pressure-sensitive adhesive material 35 off is easy and both the face plate 30 and the upper polarizer 14 can be salvaged.

Figure 11:
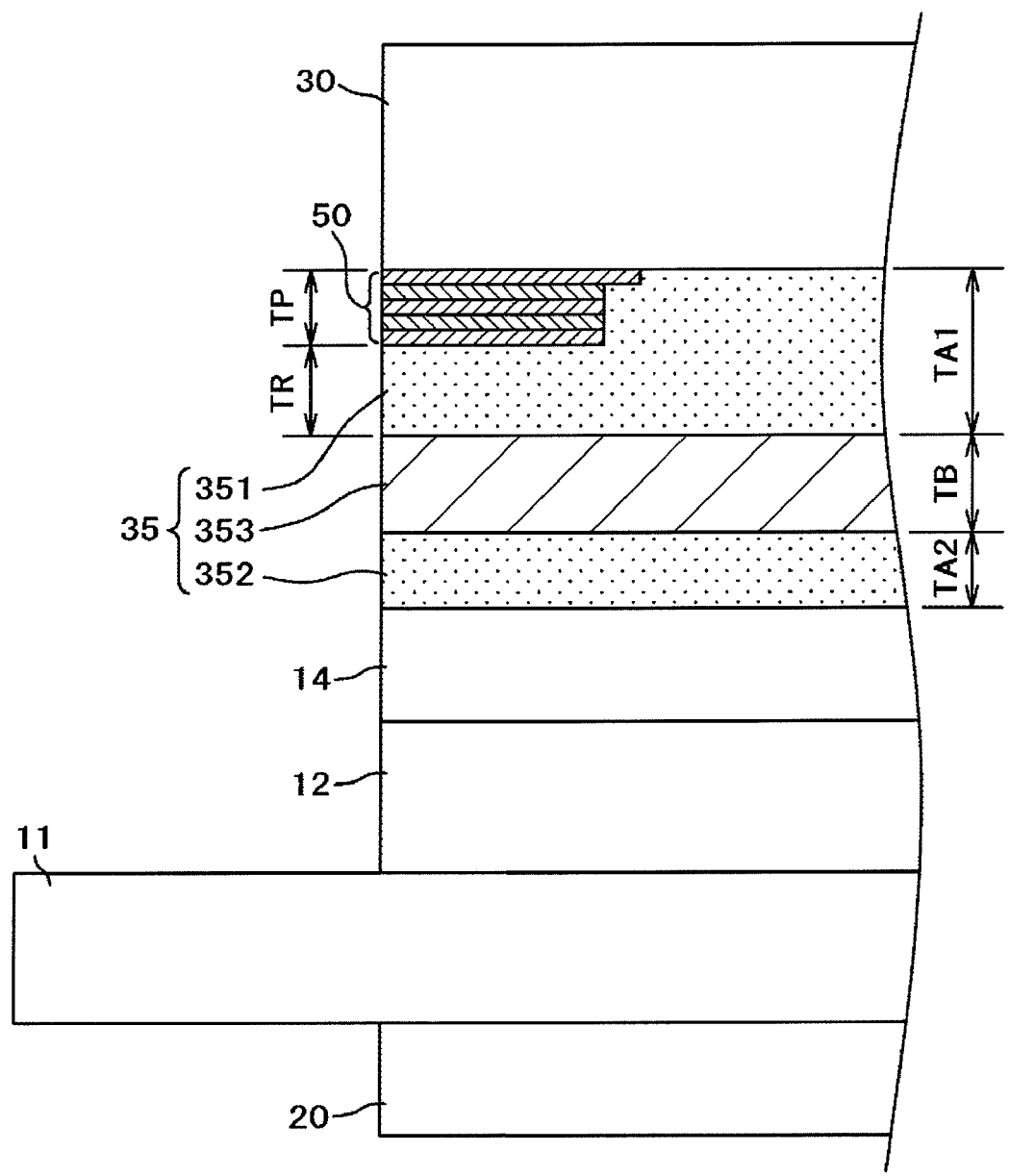
FIG. 11 is a sectional view according to the second embodiment of the present invention.

FIG. 11 is a detailed sectional view of the hybrid liquid crystal display panel according to this embodiment. Five layers of printing are formed as the frame 50 along the perimeter of the face plate 30. The total thickness TP of this frame 50 is 40 µm. The pressure-sensitive adhesive material used to bond the face plate 30 to the liquid crystal display panel has the three-layer structure described with reference to FIG. 9. Specifically, the employed pressure-sensitive adhesive material has the first pressure-sensitive adhesive member 351 on one side of the base material 353, which is formed of PET, and the second pressure-sensitive adhesive member 352 on the other side.

A thickness TA1 of the first pressure-sensitive adhesive member 351, which adheres to the face plate 30 side, is 100 µm. The thickness of the pressure-sensitive adhesive material 35 under the frame 50 is 60 µm. When succeeding in maintaining this thickness or so, the pressure-sensitive adhesive material 35 can endure stress caused by the thermal expansion of the face plate 30.

The base material 353 which is PET can have various thicknesses to suite the need. While a PET thickness TB is 50 µm in this embodiment, a PET base material with a thickness of about 25 µm may be used instead.

The second pressure-sensitive adhesive member 352 bonds the pressure-sensitive adhesive material 35 to the liquid crystal display panel. No printed frame 50 is formed on the liquid crystal display panel side unlike the face plate 30 side, and hence the second pressure-sensitive adhesive member 352 does not need to be thick. A thickness TA2 of the second pressure-sensitive adhesive member 352 is 20 µm in this embodiment.

The total thickness of the pressure-sensitive adhesive material 35 is therefore 170 µm. At this thickness, the three-layer structure pressure-sensitive adhesive material 35 is not far from the thickness of the normal, single-layer pressure-sensitive adhesive material 35. The thickness of the three-layer structure pressure-sensitive adhesive material 35 can be chosen from the standpoint of necessary adhesion, the ease of handling of the pressure-sensitive adhesive material 35, or the like.

The first pressure-sensitive adhesive member 351, which is set thicker than the second pressure-sensitive adhesive member 352, is very effective when the thickness of the first pressure-sensitive adhesive member 351 is 1.4 times the thickness of the second pressure-sensitive adhesive member 352 or more. While the thickness of the first pressure-sensitive adhesive member 351 is 1.4 times the thickness of the second pressure-sensitive adhesive member 352, the second pressure-sensitive adhesive member 352 needs to be thick enough to ensure sufficient adhesion. For example, when the thickness of the second pressure-sensitive adhesive member 352 is 20 µm, necessary adhesion is secured within a specific temperature range. The thickness of the first pressure-sensitive adhesive member 351 in this case is, at minimum, 28 μm, which provides enough adhesion to the frame 50 formed by multi-layer printing to a total thickness of about 12 μm.

In another aspect of the present invention, setting the first pressure-sensitive adhesive member 351 thicker than the second pressure-sensitive adhesive member 352 by 20 μm is effective. For example, when the thickness of the second pressure-sensitive adhesive member 352 is 20 μm, the first pressure-sensitive adhesive member 351 is set to a thickness of 40 μm or more. The first pressure-sensitive adhesive member 351 in this case provides enough adhesion despite the presence of the frame 50 formed by multi-layer printing to a total thickness of about 16 μm along the perimeter of the face plate 30.

A pressure-sensitive adhesive material used to bond a liquid crystal display panel and a face plate together is prone to plastic deformation. For that reason, adhering a pressure-sensitive adhesive material at an early stage of the bonding of a liquid crystal display panel and a face plate is effective in most cases in preventing the face plate from peeling off of the liquid crystal display panel during the subsequent cyclic heating-cooling. It is therefore important to adhere a pressure-sensitive adhesive material at an early stage without trapping air bubbles or the like when a pressure-sensitive adhesive material is used to bond a face plate and a liquid crystal display panel together.

The initial adhesion of a pressure-sensitive adhesive material between a face plate and a liquid crystal display panel can be evaluated by a method that uses an autoclave. This evaluation method is as follows:

In the case where air bubbles are trapped in bonding a face plate and a liquid crystal display panel, the hybrid liquid crystal display panel is put in an autoclave to be placed under high atmospheric pressure, for example, 3 atm., at 55° C. for 30 minutes. The trapped air bubbles as a result become smaller, or are completely gone. The adhesion is evaluated as enough in the case where the air bubbles are successfully eradicated, and as insufficient in the case where the air bubbles do not vanish.

Figure 12:
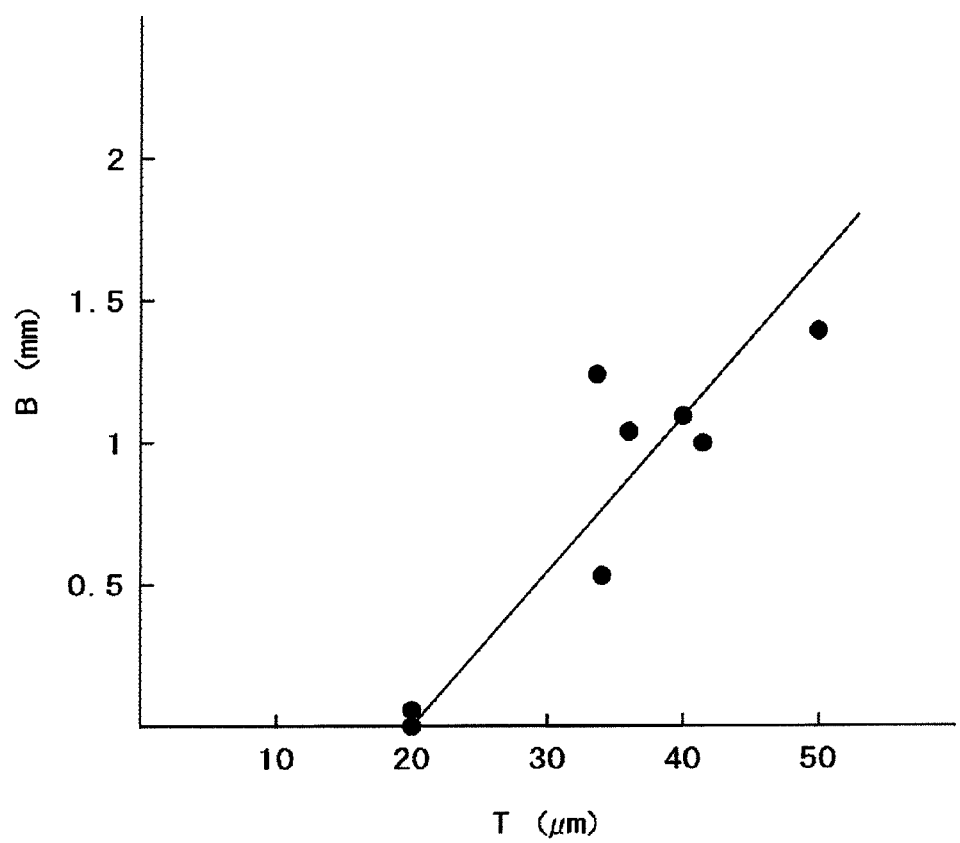
FIG. 12 is a graph illustrating an adhesion evaluation of a pressure-sensitive adhesive material.

FIG. 12 illustrates an adhesion evaluation that uses this autoclave evaluation method. The pressure-sensitive adhesive material used in the evaluation of FIG. 12 is one illustrated in FIG. 9, and has the first pressure-sensitive adhesive member 351 with a thickness of 50 μm, the base material 353 with a thickness of 25 μm, and the second pressure-sensitive adhesive member 352 with a thickness of 25 μm. In FIG. 12, the horizontal axis represents the total thickness (T) of a frame printed along the perimeter of the face plate. The vertical axis represents the diameter (B) of an air bubble. Trapped air bubbles disappear under certain conditions.

As the total thickness of the printed frame increases in FIG. 12, remaining air bubbles, too, increase in size, which means that the adhesion is not enough. According to FIG. 12, air bubbles vanish when the total thickness of the printed frame is 20 μm or less. In other words, air bubbles can be eradicated when the total thickness of the frame is up to 40% of the thickness of the pressure-sensitive adhesive material. The thickness of the pressure-sensitive adhesive material in this case is 2.5 times the total thickness of the frame or more. If up to 3σ or so is to be taken into account considering the number of pieces of data in FIG. 12, the total thickness of the frame is more desirably up to 30% of the thickness of the pressure-sensitive adhesive material. The thickness of the pressure-sensitive adhesive material in this case is 3.3 times the total thickness of the frame or more.

Third Embodiment

Figure 13:
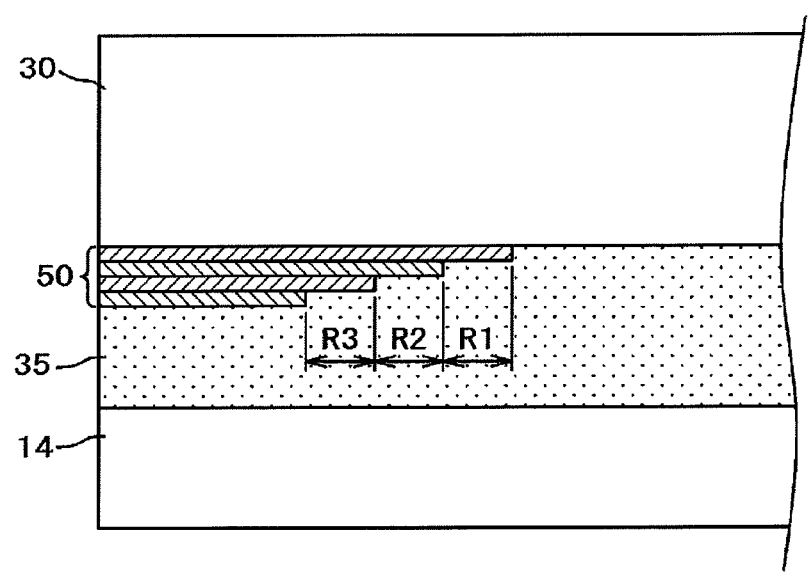
FIG. 13 is a diagram illustrating an example of printing a frame pattern according to a third embodiment of the present invention.

FIG. 13 is a sectional view illustrating a third embodiment of the present invention. In FIG. 13, the frame 50 is formed from four printed layers. The thermal expansion of the face plate 30 causes stress in a part where the frame 50 is formed. One of the factors for this is a sharp change in thickness of the adhesive material 31 or the pressure-sensitive adhesive material 35.

In this embodiment, the stress on the pressure-sensitive adhesive material 35 is eased through a gradual change in thickness of the pressure-sensitive adhesive material 35 which is accomplished by shifting the position of the edge of the frame 50 each time a new layer is printed. The frame 50 of FIG. 13 has four layers, and the edge of any one of the printed layers is receded toward the outside compared to one layer below this layer. Specifically, the second layer is receded by R1 from the first layer, the third layer is receded by R2 from the second layer, and the fourth layer is receded by R3 from the third layer.

While FIG. 13 illustrates as an example of a case in which the pressure-sensitive adhesive material 35 is a single layer, the third embodiment is applicable to the three-layer structure pressure-sensitive adhesive material 35 described in the second embodiment.

Fourth Embodiment

One of the characteristics of the present invention is to ensure the reliability of adhesion between the face plate 30 and the liquid crystal display panel by giving the pressure-sensitive adhesive material 35 a three-layer structure and setting the first pressure-sensitive adhesive member 351, which adheres to the face plate 30, thicker than the second pressure-sensitive adhesive member 352, which adheres to the liquid crystal display panel.

Figure 14:
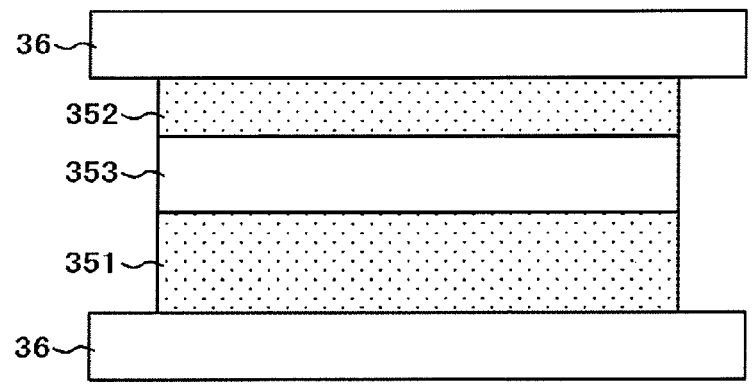
FIG. 14 is a sectional view of the pressure-sensitive adhesive material with separators attached thereto.

The pressure-sensitive adhesive material 35 before put into use is protected by members called separators 36 as illustrated in FIG. 14. The separators 36 of FIG. 14 are removed when the pressure-sensitive adhesive material 35 is placed between the face plate 30 and the liquid crystal display panel. While the separators 36 remain attached to the pressure-sensitive adhesive material 35, which side of the pressure-sensitive adhesive material 35 is thicker cannot be determined.

If the thinner side of the pressure-sensitive adhesive material 35 is adhered to the liquid crystal display panel, it makes the adhesion to the face plate 30 defective. The bonding work may be performed manually or by a machine. In either case, having a measure to determine which side of the pressure-sensitive adhesive material 35 is thicker is very important for the reliability of the product.

Figure 15A:
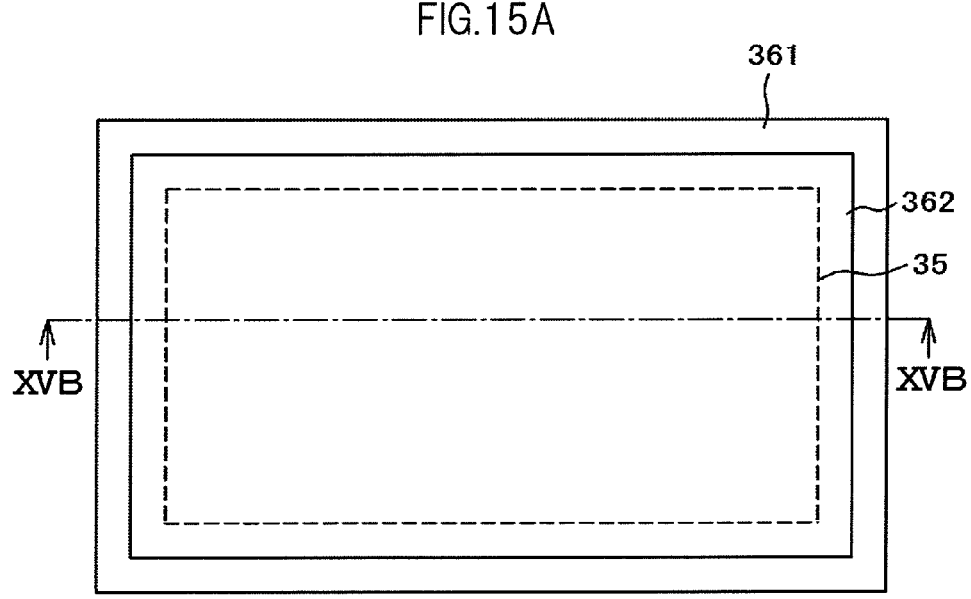
FIGS. 15A and 15B are sectional views of a pressure-sensitive adhesive material with separators attached thereto according to a fourth embodiment of the present invention.
Figure 15B:
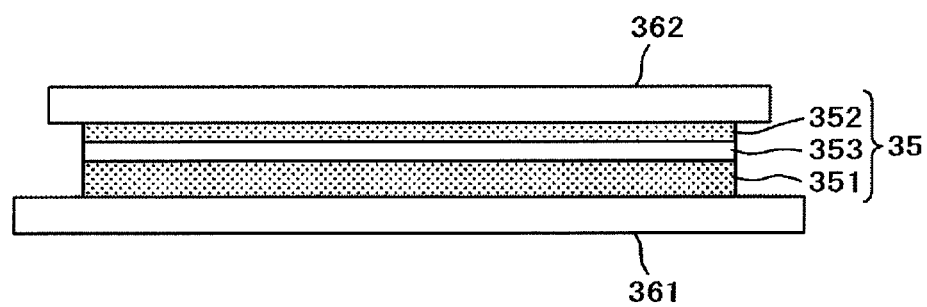

FIGS. 15A and 15B illustrate an example of the pressure-sensitive adhesive material 35 according to this embodiment. FIG. 15A is a plan view of the pressure-sensitive adhesive material 35 with separators 361 and 362 attached thereto. FIG. 15B is a sectional view taken along the line XVB-XVB of FIG. 15A. In FIG. 15A, the pressure-sensitive adhesive material 35 is protected by a first separator 361 and a second separator 362. The second separator 362 is smaller in size than the first separator 361. As illustrated in FIG. 15B, the pressure-sensitive adhesive material 35 is thicker on a side protected by the larger-sized first separator 361. The actual first pressure-sensitive adhesive member 351 and second pressure-sensitive adhesive member 352 are smaller in size than the second separator 362.

Shaping the separators 361 and 362 of the three-layer structure pressure-sensitive adhesive material 35 as illustrated in FIGS. 15A and 15B prevents an error in adhering the first pressure-sensitive adhesive member 351 and the second pressure-sensitive adhesive member 352 to their respective intended sides. In the above description, the separator on the first pressure-sensitive adhesive member 351 and the separator on the second pressure-sensitive adhesive member 352 are discriminated from each other by giving the separators different sizes, but the discrimination may be made by other attributes than the separator size. For example, the separators on the first pressure-sensitive adhesive member 351 and the second pressure-sensitive adhesive member 352 may have different colors. Alternatively, one of the separator on the first pressure-sensitive adhesive member 351 and the separator on the second pressure-sensitive adhesive member 352 may be machined to have a specific shape, or may have a design pattern. In short, it is sufficient if the two separators can be discriminated from each other in some way.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device with a liquid crystal display panel comprising:
   a thin film transistor substrate on which pixel electrodes and thin film transistors for controlling signals to the pixel electrodes are arranged in a matrix pattern;
   a color filter substrate on which color filters are formed in a manner that corresponds to the pixel electrodes;
   an upper polarizer bonded to the color filter substrate;
   a face plate formed of a resin, the face plate being placed on the upper polarizer;
   a frame having multiple printed layers, the frame being formed on a perimeter of the face plate; and
   a pressure-sensitive adhesive material interposed between the upper polarizer and the face plate, the pressure-sensitive adhesive material covering the frame, the pressure-sensitive adhesive material having a three-layer structure including a first pressure-sensitive adhesive member which adheres to the face plate, a base material, and a second pressure-sensitive adhesive member which adheres to the upper polarizer, the first pressure-sensitive adhesive member having a thickness at least 1.4 times a thickness of the second pressure-sensitive adhesive member;
   wherein when a thickness of the frame is given as TP, and a thickness of the first pressure-sensitive adhesive member in other parts than where the first pressure-sensitive adhesive member overlaps with the frame is given as TA, TA is at least 2.5 times larger than TP.

2. A liquid crystal display device according to claim 1, wherein the first pressure-sensitive adhesive member is thicker than the second pressure-sensitive adhesive member by at least 20 µm.

3. A liquid crystal display device according to claim 1, wherein the frame is formed of at least three layers, and the at least three layers are arranged so that positions of front edges on a center side of the face plate are progressively shifted outward, with a front edge of a layer of the at least three layers that is closest to the upper polarizer being farthest from the center side of the face plate.

4. A liquid crystal display device according to claim 1, wherein the face plate is formed of an acrylic resin.

5. A liquid crystal display device according to claim 1, wherein the thickness of the first pressure-sensitive adhesive member with respect to the second pressure-sensitive adhesive member, and to the thickness of the other parts of the first pressure-sensitive adhesive member where the first pressure-sensitive adhesive member overlaps with the frame are sufficient to enable good adhesion with the faceplate during usage of the liquid crystal display device.

* * * * *